United States Patent
Jin

(10) Patent No.: US 7,111,498 B2
(45) Date of Patent: Sep. 26, 2006

(54) RADIATOR INLET ADAPTER

(76) Inventor: Gang Jin, 10439 N. Stelling Rd., Cupertino, CA (US) 95014

(\*) Notice: Subject to any disclaimer, the term of this patent is extended or adjusted under 35 U.S.C. 154(b) by 275 days.

(21) Appl. No.: 10/796,689

(22) Filed: Mar. 9, 2004

(65) Prior Publication Data
US 2005/0200130 A1    Sep. 15, 2005

(51) Int. Cl.
*G01M 3/02* (2006.01)
*G01M 3/04* (2006.01)

(52) U.S. Cl. .............. 73/49.1; 73/40; 73/49.7; 73/49.8

(58) Field of Classification Search .......... 73/40, 73/49.1, 49.7, 49.8; 285/382.5
See application file for complete search history.

(56) References Cited

U.S. PATENT DOCUMENTS

| 5,184,698 A | * | 2/1993 | Coffenberry | 184/1.5 |
| 5,557,966 A | * | 9/1996 | Corry | 73/49.7 |
| 5,760,296 A | * | 6/1998 | Wilson | 73/49.7 |

\* cited by examiner

*Primary Examiner*—Daniel S. Larkin

(57) ABSTRACT

An inlet adapter includes a top portion threadingly engageable to a body portion, an expandable portion disposed adjacent the body portion, and a bolt threadingly engageable to the top portion, the bolt securing the expandable portion adjacent the body portion and compressing the expandable portion in association with rotation of the body portion about the top portion.

20 Claims, 4 Drawing Sheets

RADIATOR INLET ADAPTER

BACKGROUND OF THE INVENTION

The present invention relates to pressure testing systems, and more particularly to a radiator inlet adapter for sealing a radiator filler neck in order to perform a pressure test of a coolant system of an internal combustion engine. The radiator inlet adapter advantageously provides a simple adapter for use with filler necks of various diameters thereby obviating the need for costly adapter kits and pressure testing devices and systems.

Various devices and systems have been devised for the purpose of facilitating the pressure testing of coolant systems. For example, U.S. Pat. No. 4,458,523 entitled "Cooling System Pressure Tester" discloses a cooling system pressure tester which allows consumers to determine the approximate vent pressure of their automotive cooling system, as well as to check for leaks in the system. The device includes a connecting and restriction element for introducing water into the system and an adjustable pressure relief valve for limiting the maximum pressure. The device includes a tee having a side branch, a first end branch and a second end branch. The first and second end branches have fittings respectively associated therewith for connection respectively with a source of water and the cooling system of an automobile. The device must therefore be connected to the cooling system by means of the second end branch fitting.

A pressure tester cap is disclosed in U.S. Pat. No. 4,679,424 entitled "Pressure Tester Cap". The cap includes an air valve sleeve which further houses a conventional Schrader® type air valve, and is incorporated within a pressurized radiator cap which when mounted on a neck of a radiator of a motor vehicle, permits the cooling system to be charged with compressed air from an external source, so as to ascertain if there are any leaks in the radiator system. The disclosed cap is adapted to fit only one size radiator neck.

U.S. Pat. No. 4,888,980 entitled "Apparatus and Method for Testing, Filling and Purging Closed Fluid Systems" discloses an evacuation unit for testing the fluid tightness of a closed fluid system, filling the system with system fluid, and/or purging the system fluid of entrained gas. The evacuation unit includes a source of system fluid, an air operated venturi vacuum pump, a hose for releasable and sealable connection to an access port of the closed fluid system, and a three way valve for selected positioning between a first position communicating the vacuum pump with the flexible hose system to produce a vacuum in the system, a second position isolating the flexible hose and system to test for fluid tightness, and a third position communicating the system for filling the system through the access port with system fluid. A filler head is disclosed for releasable and sealable connection to the access port of the closed fluid system. The filler head is adapted to fit only one size access port.

Another pressure testing device is disclosed in U.S. Pat. No. 5,105,653 entitled "Pressure Testing Device for Vehicle Radiators and Cooling Systems". The device includes a connecting means and restriction component for discharging compressed air into the coolant system with an adjustable pressure relief valve for limiting the maximum pressure. The device further includes a radiator inlet adapter having an upper body with flanged ears designed to hold the adapter in place when installed on a radiator or other test device, a spring to hold pressure and also allow a secondary pressure relief when the device is attached for test purposes, and upper and lower spring backing plates for centering a sealing washer on a radiator filler neck. The radiator inlet adapter is adapted to fit only one size radiator inlet.

A device for monitoring the temperature and pressure of a liquid coolant in a cooling system is disclosed in U.S. Pat. No. 5,324,114 entitled "Temperature and Pressure Sensor for Cooling Systems and Other Pressurized Systems". The device includes a sealant which seals around a needle from a pressure or temperature probe and re-seals itself upon removal of the needle. A body of the device is attachable to an opening member of a liquid cooling system, such as a radiator. The body includes tabs of a flange which are insertable in recesses of a lip of a radiator neck. The device is adapted to fit only one size radiator neck.

A cooling system pressure tester is available from Danaher Corporation of Washington, D.C. and includes a hand pump and a plurality of adapters connectable to a radiator filler neck. The adapters are sized and configured to fit a plurality of coolant system filler necks including small diameter necks (31 mm). Other commercially available systems include devices having an expandable bladder for sealing the filler neck.

As can be seen, there is a need in the art for a radiator inlet adapter for use with radiator filler necks of various diameters which is of simple construction and easy to use.

SUMMARY OF THE INVENTION

In accordance with the present invention, an inlet adapter includes a top portion threadingly engageable to a body portion, an expandable portion disposed adjacent the body portion, and a bolt threadingly engageable to the top portion, the bolt securing the expandable portion adjacent the body portion and compressing the expandable portion in association with rotation of the body portion about the top portion In accordance with another aspect of the present invention, an inlet adapter includes a top portion having a threaded portion threadingly engageable with a threaded bore of a body portion, an expandable portion disposed adjacent the body portion, and a bolt threadingly engageable with a threaded bore formed in the threaded portion, the bolt securing the expandable portion adjacent the body portion and compressing the expandable portion in association with rotation of the body portion about the threaded portion.

In accordance with yet another of the present invention, a radiator inlet adapter for use with a radiator filler neck of circular cross section includes a top portion having a bore extending therethrough and a threaded portion threadingly engageable with a threaded bore of a body portion, an expandable portion disposed adjacent the body portion, the expandable portion having a circular cross section, and a bolt threadingly engageable with a threaded bore formed in the threaded portion, the bolt securing the expandable portion adjacent the body portion and compressing the expandable portion in association with rotation of the body portion about the threaded portion.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
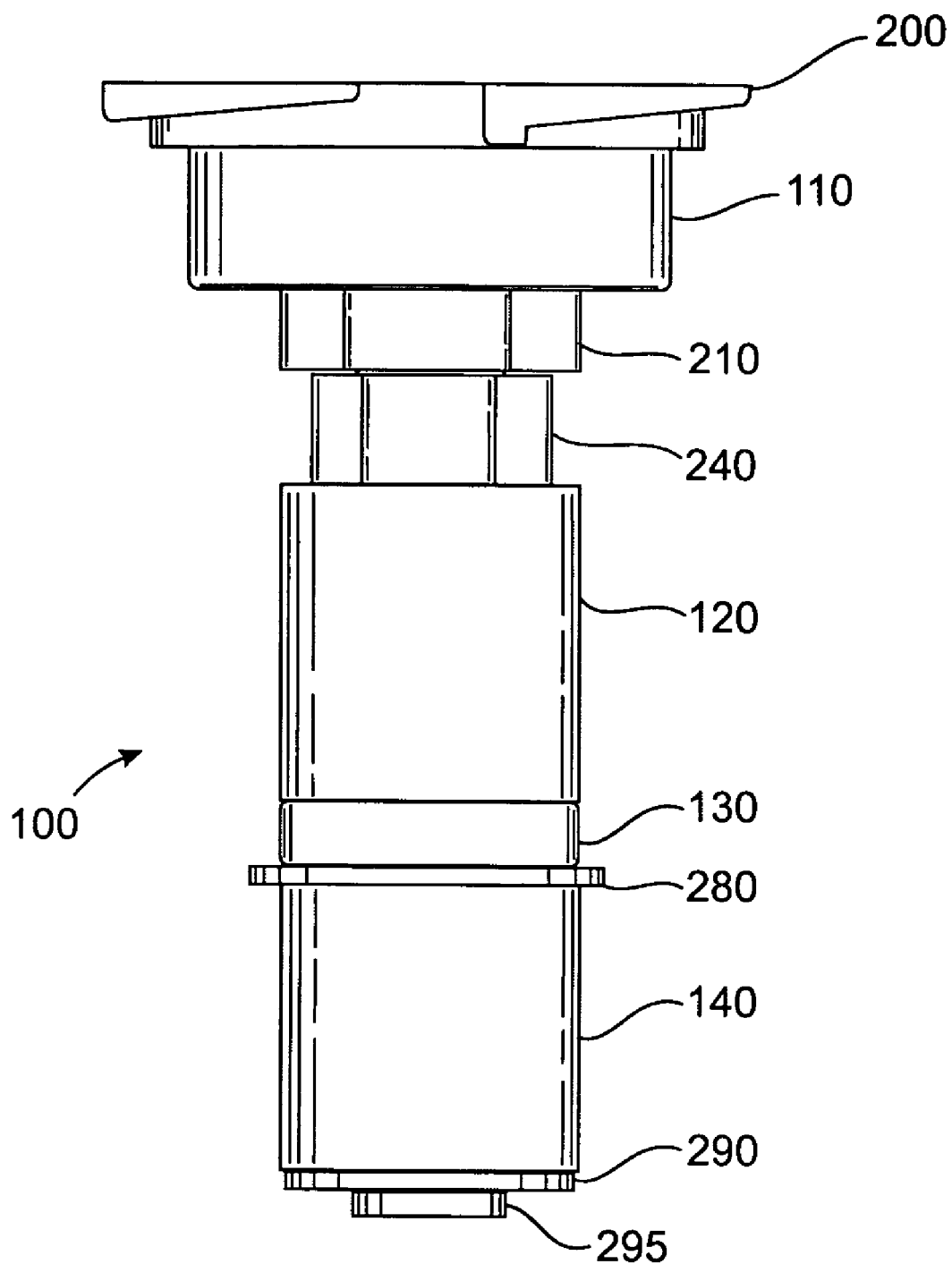
FIG. 1 is side elevation view of a radiator inlet adapter in accordance with the present invention.
Figure 3:
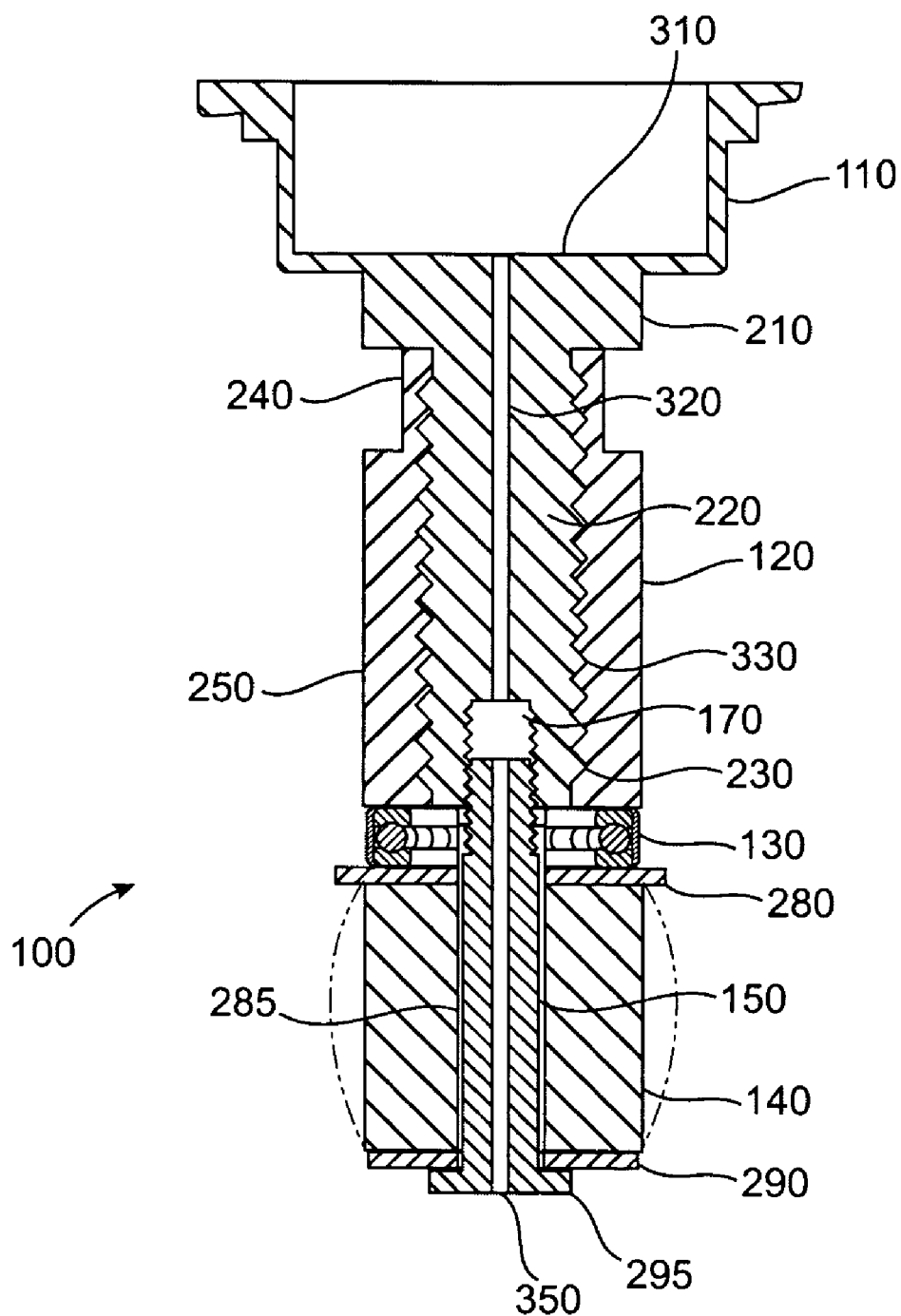
FIG. 3 is a cross sectional view of the radiator inlet adapter in accordance with the present invention.

Referring now to the drawings in detail, a radiator inlet adapter generally designated 100 may include a top portion 110, a body portion 120, a thrust bearing portion 130, and an expandable portion 140. A bolt 150 having left-handed threads 160 may be threadingly engageable with a threaded top portion bore 170 in an assembled configuration such as shown in FIG. 1 and FIG. 3.

Figure 2:
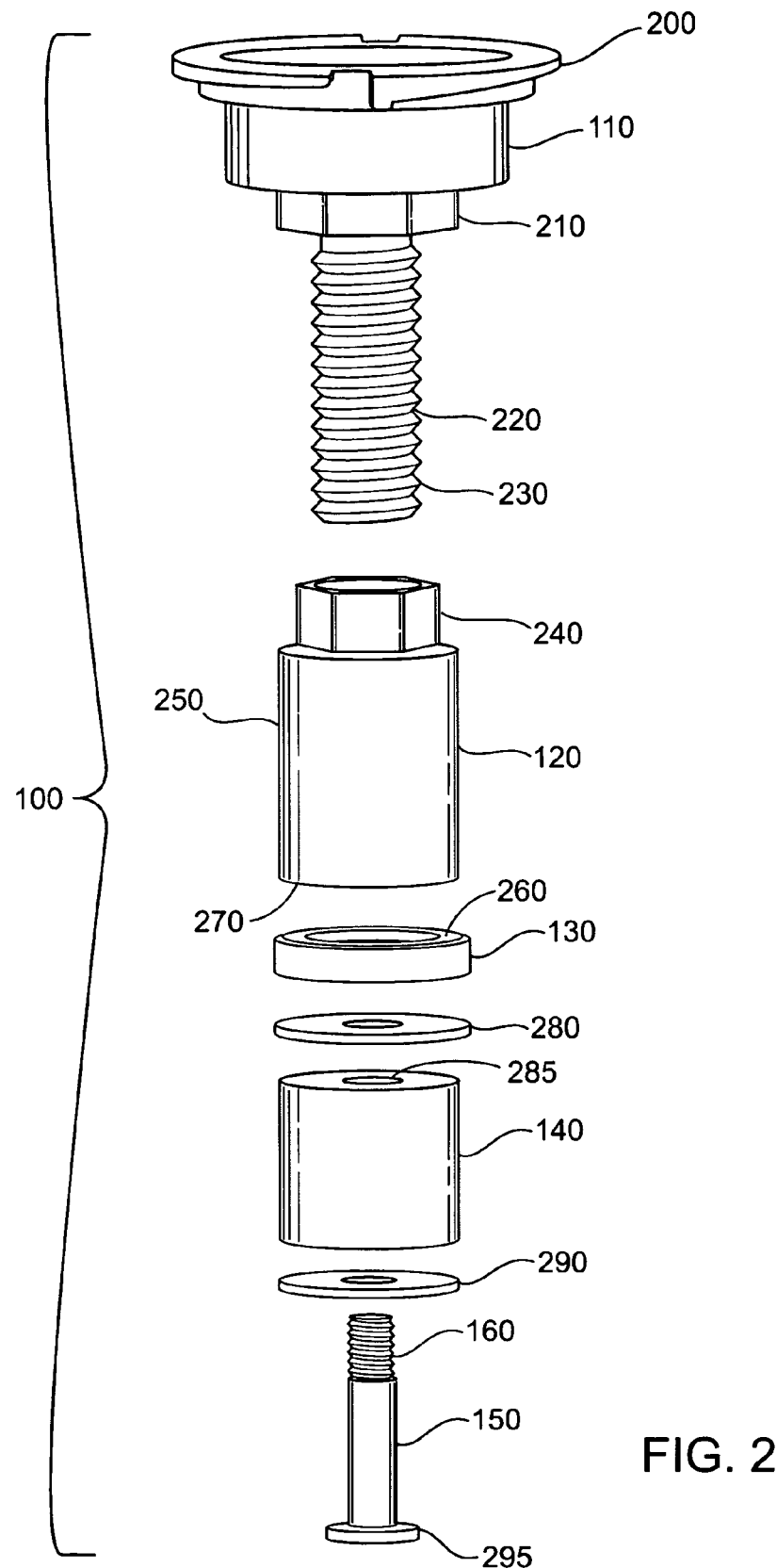
FIG. 2 is an exploded view of the radiator inlet adapter in accordance with the present invention.

With particular reference to FIG. 2, top portion 110 may be of unitary construction and include a radiator neck portion 200 sized and configured to accept a radiator cap (not shown) or a cap portion of a pressure testing system pump (not shown). Top portion may be manufactured of any suitable material including steel. Radiator neck portion 200 may include a bottom portion 310 (FIG. 3) through which is formed a transverse bore 320 in communication with threaded top portion bore 170.

Top portion 110 may further include a threaded portion 220 having threaded top portion bore 170 formed at an end 230 thereof. A hex portion 210 may be formed with bottom portion 310 as a top surface, hex portion being disposed intermediate radiator neck portion 200 and threaded portion 220.

Body portion 120 may include a hex portion 240 and a cylindrical portion 250. A body portion threaded bore 330 for receiving threaded portion 220 may be formed in body portion 120.

Thrust bearing portion 130 may include a conventional thrust bearing. A thrust bearing rotating washer 260 may be disposed adjacent a body portion bottom surface 270 in the assembled configuration. Thrust bearing portion 130 may be adapted to provide rotation separation of the body portion 120 and a first washer 280 as described herein.

Expandable portion 140 may be manufactured from a deformable material, such as rubber, and include a circular cross section. Expandable portion 140 may include a bore 285 formed therethrough. In the assembled configuration, expandable portion 140 may be disposed between a first washer 280 and a second washer 290. Preferably, first washer 280 has a larger diameter than expandable portion 140 and second washer 290 has a smaller diameter than expandable portion 140.

Bolt 150 having left-handed threads 160 may be adapted to threadingly engage threaded top portion bore 170 in the assembled configuration. Bolt 150 may include a head 295 having a larger diameter than an inner diameter of second washer 290. A bore 350 is formed in bolt 150.

In use, the radiator inlet adapter 100 may be assembled in the assembled configuration by sliding bolt 150 through second washer 290, expandable portion 140, first washer 280 and thrust bearing portion 130, respectively. Threaded portion 220 may next be threadingly engaged in body portion threaded bore 330 in such manner that left-handed threads 160 of bolt 150 are threadingly engageable to threaded top portion bore 170. In the assembled configuration, a space (not shown) may be disposed between hex portions 210 and 240. Hex portions 210 and 240 may be used for rotating body portion 120 and top portion 110.

Figure 4:
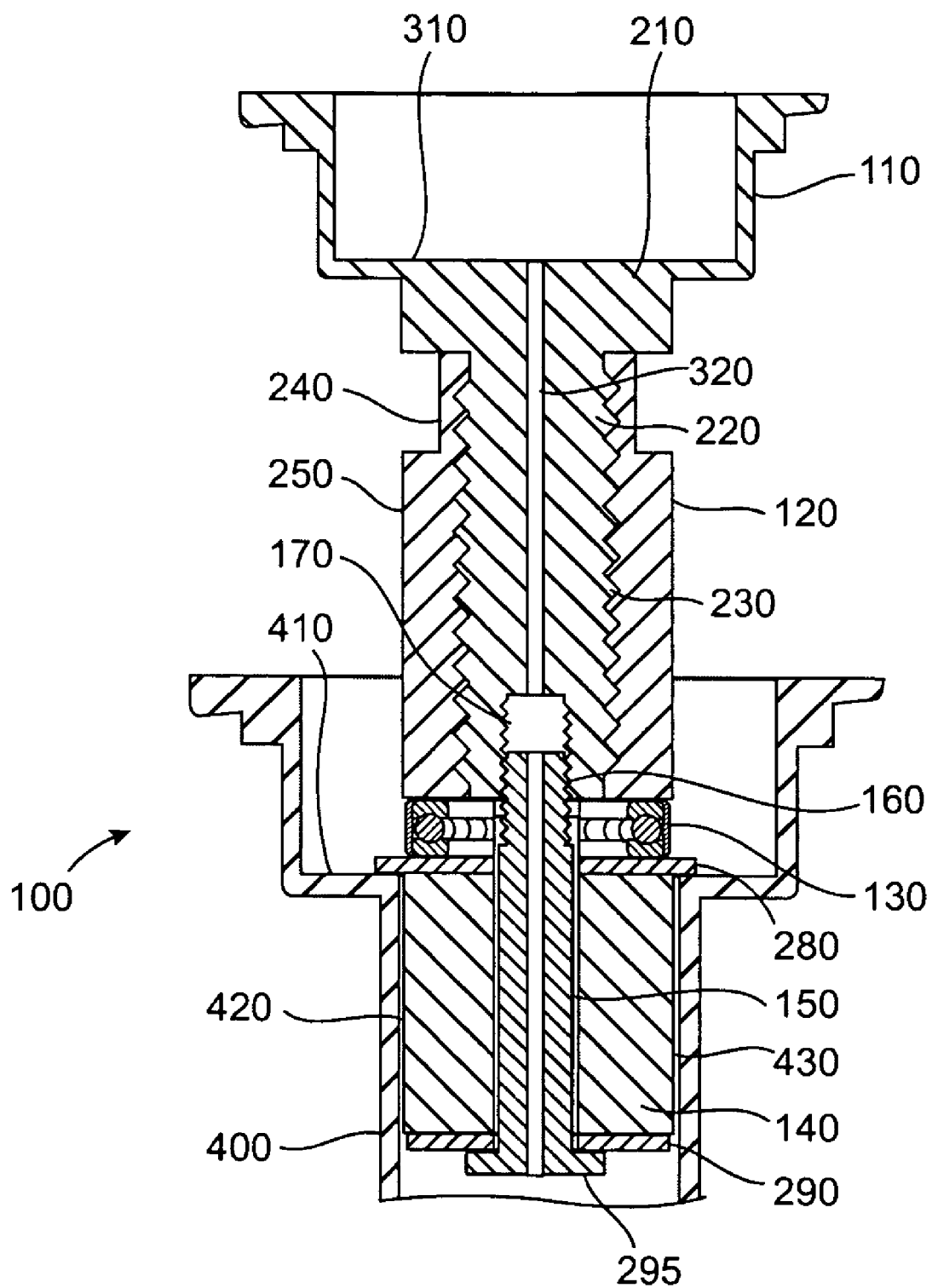
FIG. 4 is a cross sectional view of the radiator inlet adapter showing the adapter in use in accordance with the present invention.

Radiator inlet adapter 100 may be positioned in a radiator filler neck 400 in such manner that first washer 280 is disposed adjacent a radiator filler neck top surface 410 (FIG. 4). Turning body portion 120 in a clockwise direction relative to top portion 110 causes bolt 150 to move toward top portion 110 in threaded top portion bore 170. Such movement of bolt 150 compresses expandable portion 140 between first washer 280 and second washer 290 as shown in FIG. 3. Compression of expandable portion 140 causes a side surface 420 of expandable portion 140 to sealingly contact an inner surface 430 of radiator filler neck 400 to thereby form a seal useful in pressure testing a fluid system (not shown) associated with radiator filler neck 400. A conventional pump (not shown) may be engageable to radiator neck portion 200 to pressurize the fluid system.

Thrust bearing portion 130 may provide rotation separation between body portion 120 and first washer 280. In this manner, rotation of body portion 120 is separated from rotation of expandable portion 140.

Conventionally, radiator filler neck 400 may have an inner diameter ranging from 20–50 mm. Expandable portion 140 may have a diameter of 18 mm, 27 mm, 35 mm, and 40 mm for use with radiator filler necks 400 of different diameters.

As shown, the radiator inlet adapter of the invention overcomes the deficiencies of the prior art by providing a radiator inlet adapter for use with radiator filler necks of various diameters which is of simple construction and easy to use. It should be understood, of course, that the foregoing relates to preferred embodiments of the invention and that modifications may be made without departing from the spirit and scope of the invention. For example, washers 280 and 290 may be of varied diameters to accommodate expandable portions 140 of different diameters. Any such modifications should in no way limit the scope of the invention, which should only be determined based on the following claims.

I claim:

1. An inlet adapter comprising:
a top portion threadingly engageable to a body portion;
an expandable portion disposed adjacent the body portion; and
a bolt threadingly engageable to the top portion, the bolt securing the expandable portion adjacent the body portion and compressing the expandable portion in association with rotation of the body portion about the top portion.

2. The inlet adapter of claim 1, wherein the top portion comprises a bore extending therethrough, a radiator neck portion, a hex portion, and a threaded portion, the threaded portion having a threaded bore threadingly engageable to the bolt.

3. The inlet adapter of claim 1, wherein the bolt comprises a bore extending therethrough and left-handed threads at an end thereof.

4. The inlet adapter of claim 1, wherein the expandable portion comprises a cylindrical portion.

5. The inlet adapter of claim 1, further comprising a first washer disposed intermediate the expandable portion and the body portion and a second washer disposed intermediate the expandable portion and a bolt head.

6. The inlet adapter of claim 5, further comprising a thrust bearing disposed intermediate the first washer and the body portion.

7. The inlet adapter of claim 1, wherein the body portion comprises a hex portion.

8. An inlet adapter comprising:
a top portion having a threaded portion threadingly engageable with a threaded bore of a body portion;
an expandable portion disposed adjacent the body portion; and
a bolt threadingly engageable with a threaded bore formed in the threaded portion, the bolt securing the expandable portion adjacent the body portion and compressing the expandable portion in association with rotation of the body portion about the threaded portion.

9. The inlet adapter of claim 8, wherein the top portion comprises a bore extending therethrough, a radiator neck portion and a hex portion.

10. The inlet adapter of claim 9, wherein the body portion comprises a hex portion, the body portion hex portion disposed proximate the top portion hex portion.

11. The inlet adapter of claim 8, wherein the bolt comprises a bore extending therethrough and left-handed threads at an end thereof.

12. The inlet adapter of claim 8, wherein the expandable portion comprises a cylindrical portion.

13. The inlet adapter of claim 8, further comprising a first washer disposed intermediate the expandable portion and the body portion and a second washer disposed intermediate the expandable portion and a bolt head.

14. The inlet adapter of claim 13, further comprising a thrust bearing disposed intermediate the first washer and the body portion.

15. A radiator inlet adapter for use with a radiator filler neck of circular cross section comprising:
a top portion having a bore extending therethrough and a threaded portion threadingly engageable with a threaded bore of a body portion;
an expandable portion disposed adjacent the body portion, the expandable portion having a circular cross section; and
a bolt threadingly engageable with a threaded bore formed in the threaded portion, the bolt securing the expandable portion adjacent the body portion and compressing the expandable portion in association with rotation of the body portion about the threaded portion.

16. The radiator inlet adapter of claim 15, wherein the top portion comprises a radiator neck portion and a hex portion.

17. The radiator inlet adapter of claim 16, wherein the body portion comprises a hex portion, the body portion hex portion disposed proximate the top portion hex portion.

18. The radiator inlet adapter of claim 15, wherein the bolt comprises left-handed threads at an end thereof.

19. The radiator inlet adapter of claim 15, further comprising a first washer disposed intermediate the expandable portion and the body portion and a second washer disposed intermediate the expandable portion and a bolt head.

20. The radiator inlet adapter of claim 19, further comprising a thrust bearing disposed intermediate the first washer and the body portion.

* * * * *